Figure 1:
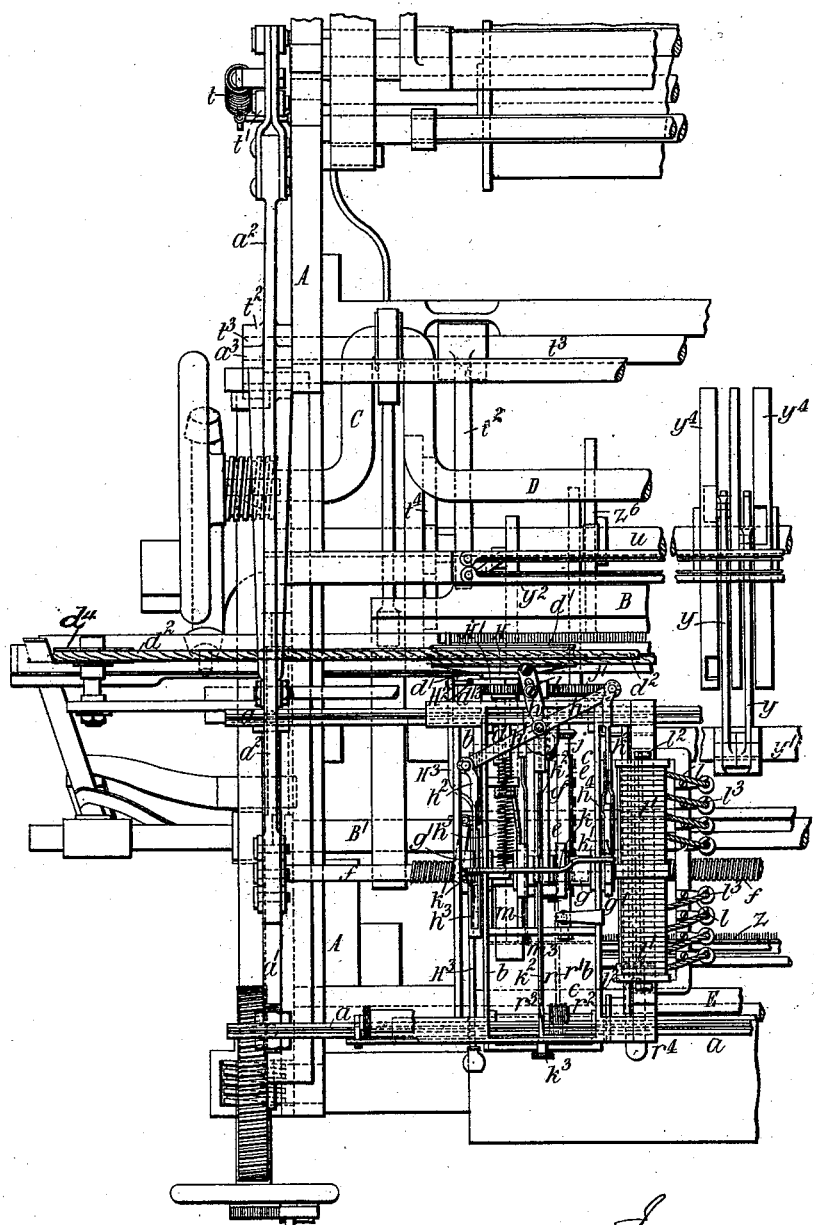

(No Model.) 16 Sheets—Sheet 1.
W. YOUNGJOHNS.
LOOM FOR WEAVING TUFTED FABRICS.

No. 510,755. Patented Dec. 12, 1893.

(No Model.) 16 Sheets—Sheet 2.

W. YOUNGJOHNS.
LOOM FOR WEAVING TUFTED FABRICS.

No. 510,755. Patented Dec. 12, 1893.

(No Model.) 16 Sheets—Sheet 3.

W. YOUNGJOHNS.
LOOM FOR WEAVING TUFTED FABRICS.

No. 510,755. Patented Dec. 12, 1893.

(No Model.) 16 Sheets—Sheet 4.

W. YOUNGJOHNS.
LOOM FOR WEAVING TUFTED FABRICS.

No. 510,755. Patented Dec. 12, 1893.

(No Model.) 16 Sheets—Sheet 5.

W. YOUNGJOHNS.
LOOM FOR WEAVING TUFTED FABRICS.

No. 510,755. Patented Dec. 12, 1893.

(No Model.) 16 Sheets—Sheet 6.

W. YOUNGJOHNS.
LOOM FOR WEAVING TUFTED FABRICS.

No. 510,755. Patented Dec. 12, 1893.

(No Model.)  16 Sheets—Sheet 7.

W. YOUNGJOHNS.
LOOM FOR WEAVING TUFTED FABRICS.

No. 510,755.  Patented Dec. 12, 1893.

(No Model.) 16 Sheets—Sheet 8.

W. YOUNGJOHNS.
LOOM FOR WEAVING TUFTED FABRICS.

No. 510,755. Patented Dec. 12, 1893.

Witnesses:
J. A. Rutherford
J. H. W. Daly

Inventor
William Youngjohns,
By James L. Norris
Attorney (No Model.) 16 Sheets—Sheet 9.

W. YOUNGJOHNS.
LOOM FOR WEAVING TUFTED FABRICS.

No. 510,755. Patented Dec. 12, 1893.

Witnesses:
J. A. Rutherford
J. H. Daly

Inventor:
William Youngjohns
By James L. Norris
Attorney (No Model.) 16 Sheets—Sheet 10.
W. YOUNGJOHNS.
LOOM FOR WEAVING TUFTED FABRICS.
No. 510,755. Patented Dec. 12, 1893.
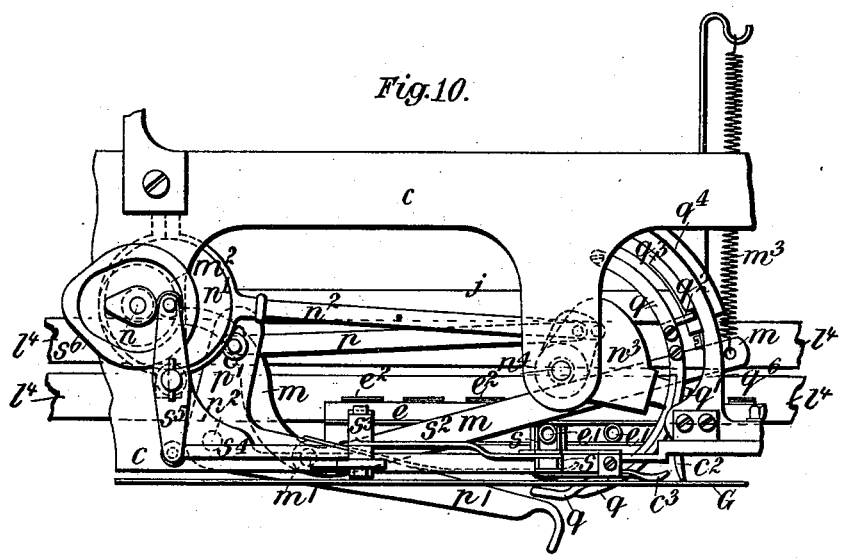
Fig. 10.
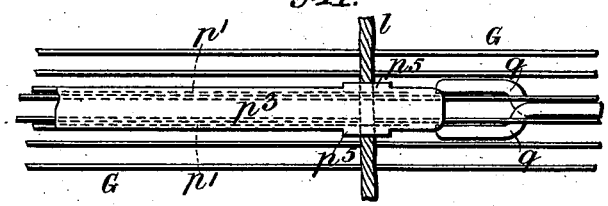
Fig. 11.
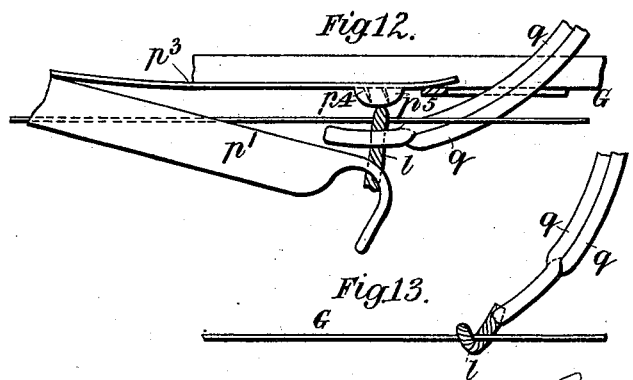
Fig. 12.
Fig. 13.
Witnesses:
J. A. Rutherford
J. H. Daly
Inventor:
William Youngjohns
By James L. Norris
Attorney.

(No Model.)  W. YOUNGJOHNS.  16 Sheets—Sheet 11.
LOOM FOR WEAVING TUFTED FABRICS.
No. 510,755.  Patented Dec. 12, 1893.
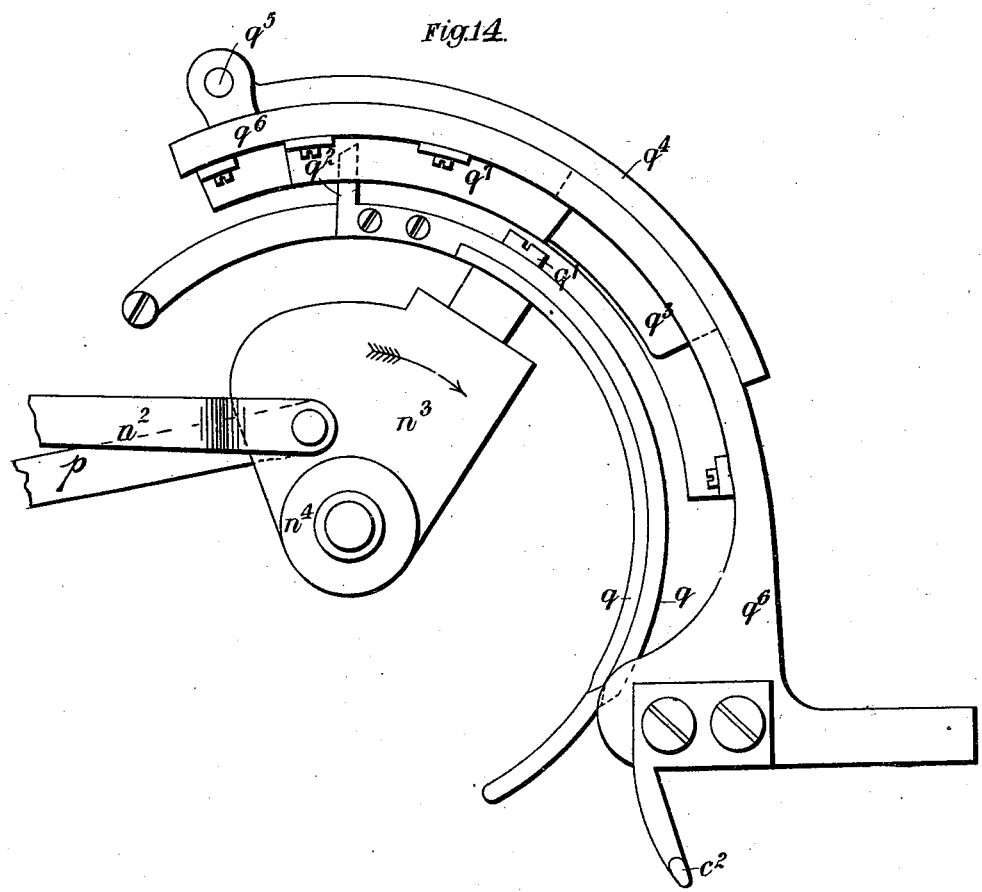
Fig. 14.
Fig. 15.
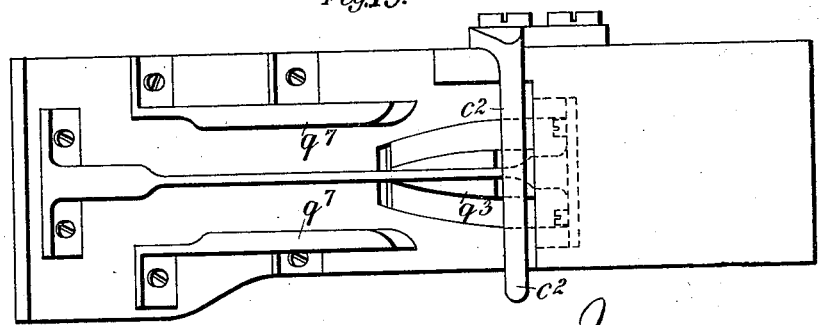

(No Model.) 16 Sheets—Sheet 12.

W. YOUNGJOHNS.
LOOM FOR WEAVING TUFTED FABRICS.

No. 510,755. Patented Dec. 12, 1893.

(No Model.)  16 Sheets—Sheet 13.
W. YOUNGJOHNS.
LOOM FOR WEAVING TUFTED FABRICS.
No. 510,755. Patented Dec. 12, 1893.
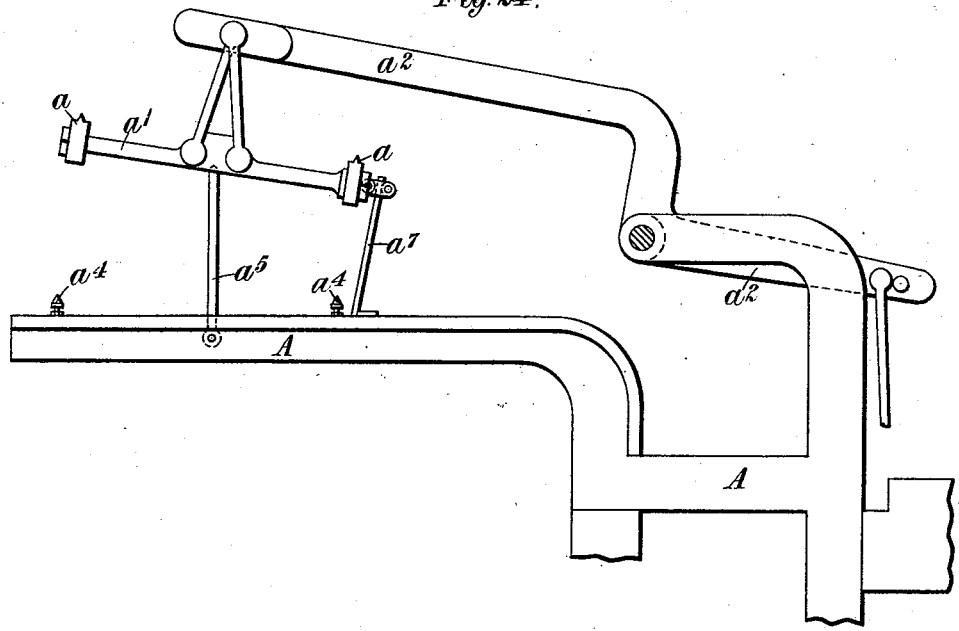
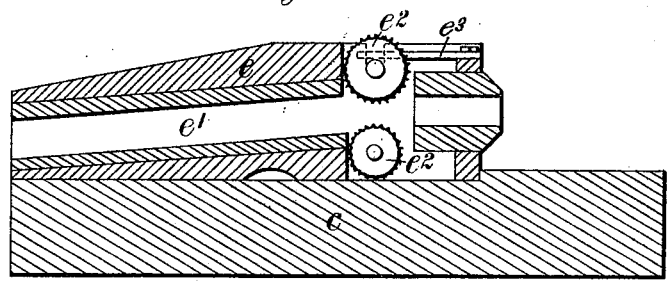

(No Model.)   W. YOUNGJOHNS.   16 Sheets—Sheet 14.
LOOM FOR WEAVING TUFTED FABRICS.
No. 510,755.   Patented Dec. 12, 1893.

(No Model.) 16 Sheets—Sheet 15.

W. YOUNGJOHNS.
LOOM FOR WEAVING TUFTED FABRICS.

No. 510,755. Patented Dec. 12, 1893.

Witnesses:—
J. A. Rutherford.
J. H. Daly.

Inventor:
William Youngjohns
By James L. Norris.
Attorney (No Model.)

16 Sheets—Sheet 16.

W. YOUNGJOHNS.
LOOM FOR WEAVING TUFTED FABRICS.

No. 510,755.

Patented Dec. 12, 1893.

Witnesses:—
J. A. Rutherford
J. H. Daly

Inventor:
William Youngjohns
By James L. Norris
Attorney

United States Patent Office.

WILLIAM YOUNGJOHNS, OF KIDDERMINSTER, ENGLAND, ASSIGNOR TO EDWARD HUGHES & SONS, OF SAME PLACE.

LOOM FOR WEAVING TUFTED FABRICS.

SPECIFICATION forming part of Letters Patent No. 510,755, dated December 12, 1893.

Application filed April 17, 1891. Serial No. 389,393. (No model.)

*To all whom it may concern:*

Be it known that I, WILLIAM YOUNGJOHNS, power-loom tuner, a subject of the Queen of Great Britain, and a resident of Blackbrook, Kidderminster, England, have invented certain new and useful Improvements in Looms for Weaving Tufted Fabrics, of which the following is a specification, reference being had to the accompanying drawings.

My invention relates to machinery or apparatus for the manufacture of Turkey carpets.

My present improvements are designed to increase the efficiency of the machinery or apparatus for weaving "Turkey" carpets by the method of the manufacture described in the Letters Patent No. 490,530, dated January 24, 1893.

The method of manufacture described in the said patent consists in first laying worsted of the desired color upon the ground chain and cutting a piece of the required length from the said worsted, then pushing the ends of the said piece through the said chain so as to inclose two of the threads thereof, bringing the said ends together beneath the chain, and then drawing them up through the said chain between the said two threads. In this manner pieces or tufts of worsted of different colors are securely attached to the said chain. The ground weft is woven in the ordinary manner after each row of pieces or tufts of worsted has been woven or secured to the chain in the manner above described. The machinery or apparatus for producing such carpets comprises feed-mechanism which is so constructed that any desired number of different colored worsteds can be fed thereby as required, into position to be operated upon by the cutting and weaving mechanism. This feed mechanism comprises a slide which is mounted in a box, frame or carriage arranged to move to and fro upon rails at the front of the loom, and is provided with a series of apertures or passages through which the different colored worsteds are conducted from reels or bobbins suitably supported upon the loom or upon the said box, frame or carriage. Feed rolls are arranged in combination with each of the said apertures or passages, and the said slide is provided with means whereby it may be adjusted to bring either of the said feed rolls into position to be operated by a feed wheel or cam. This feed wheel or cam is so constructed that it will, in each rotation feed the required quantity of worsted through the feed slide. In combination with this feed-mechanism a device is provided for indicating to the attendant which color of worsted is being fed and woven, and for enabling him to adjust the feed slide according to the color of worsted which it is desired shall be fed and woven. A knife, cutter or pair of shears is also provided which is arranged to operate, after the worsted has been fed through the aforesaid slide, to cut off a piece of the said worsted of the required length. Moreover a forked arm or lever is arranged in combination with means for operating the same to push the ends of the pieces or tufts of worsted through the ground chain, and in combination with a pair of nippers or tweezers and means for operating the same to seize the ends of the said pieces or tufts and draw them up between the threads of the said chain in the manner above mentioned. In the apparatus described in the said patent, the box or frame and carriage in which the various devices above described are arranged, is provided with means for intermittently moving it across the loom in front of the lathe, to permit the mechanism to successively insert the pieces of worsted. It is also provided with a counterweight or other suitable means for effecting its rapid return movement, after a row of pieces of worsted has been completed, to bring the mechanism into position to commence a fresh row thereof.

Now an important feature of my present invention is the construction of the machine in such a manner that the said carriage and box or frame will be automatically fed intermittently across the loom alternately in either direction, and the mechanism will operate while traveling in both directions, that is to say, the pieces or tufts of worsted of the different colors required will be inserted and knotted in the fabric while the carriage is being fed from right to left and also while the said carriage is being fed from left to right.

My said invention moreover comprises improved means whereby, the feed slide may be moved or adjusted to change the color of worsted to be fed into the fabric.

My said invention further comprises various improvements in the construction of the loom proper, to adapt it for use with the improved apparatus for inserting and knotting the tufts of worsted.

My said invention, moreover comprises other improvements hereinafter set forth and claimed.

Figure 2:
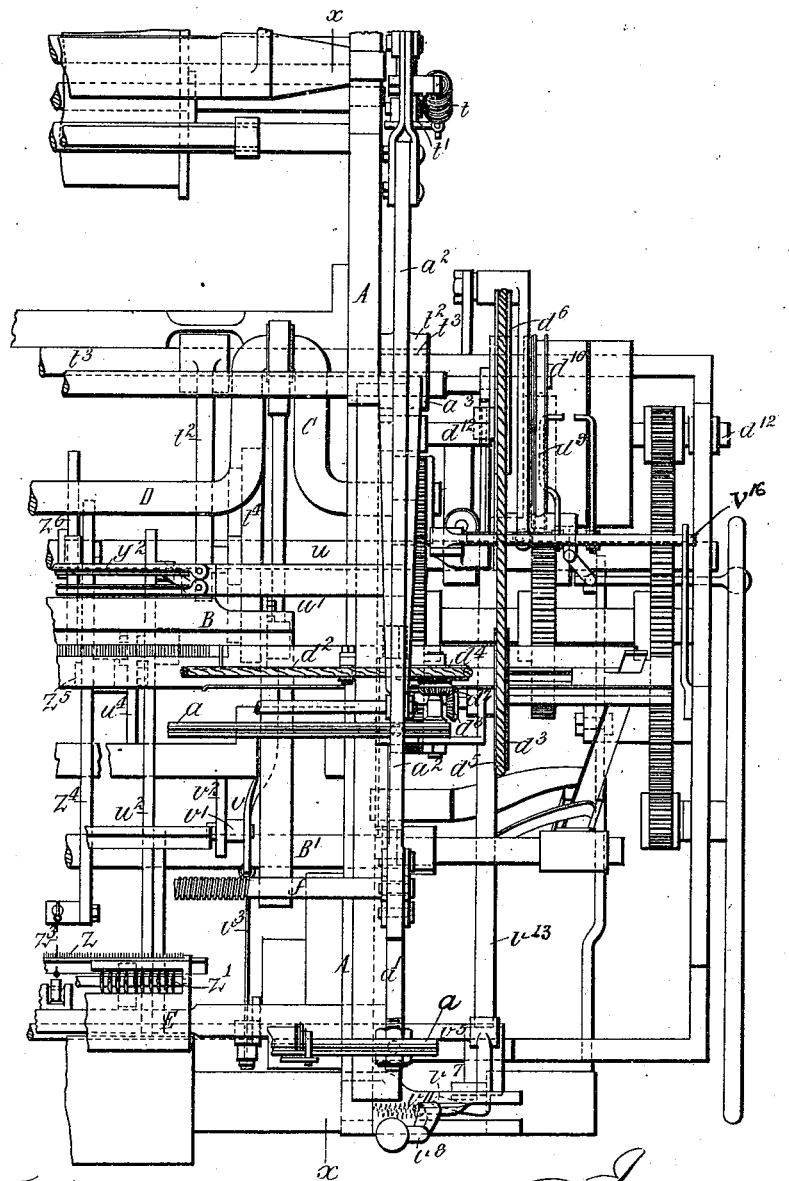
Figure 3:
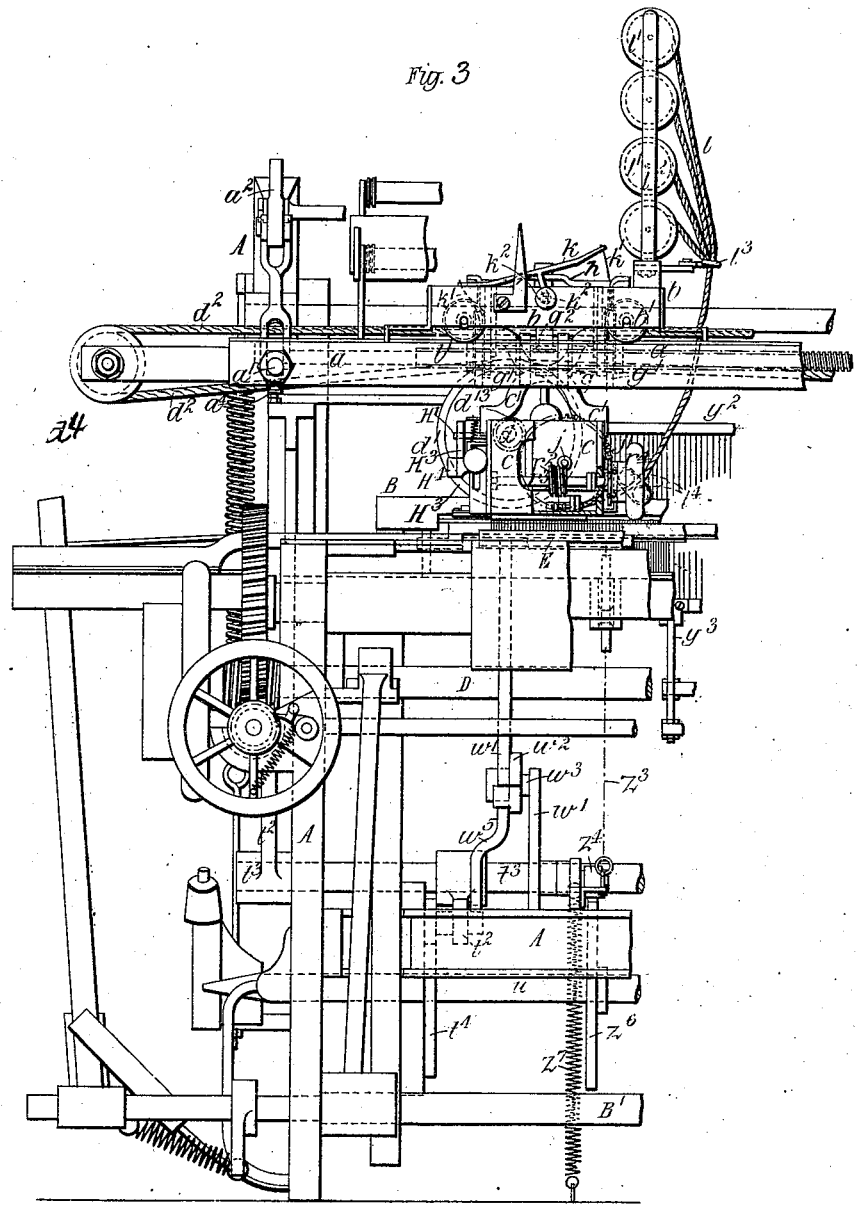
Figure 4:
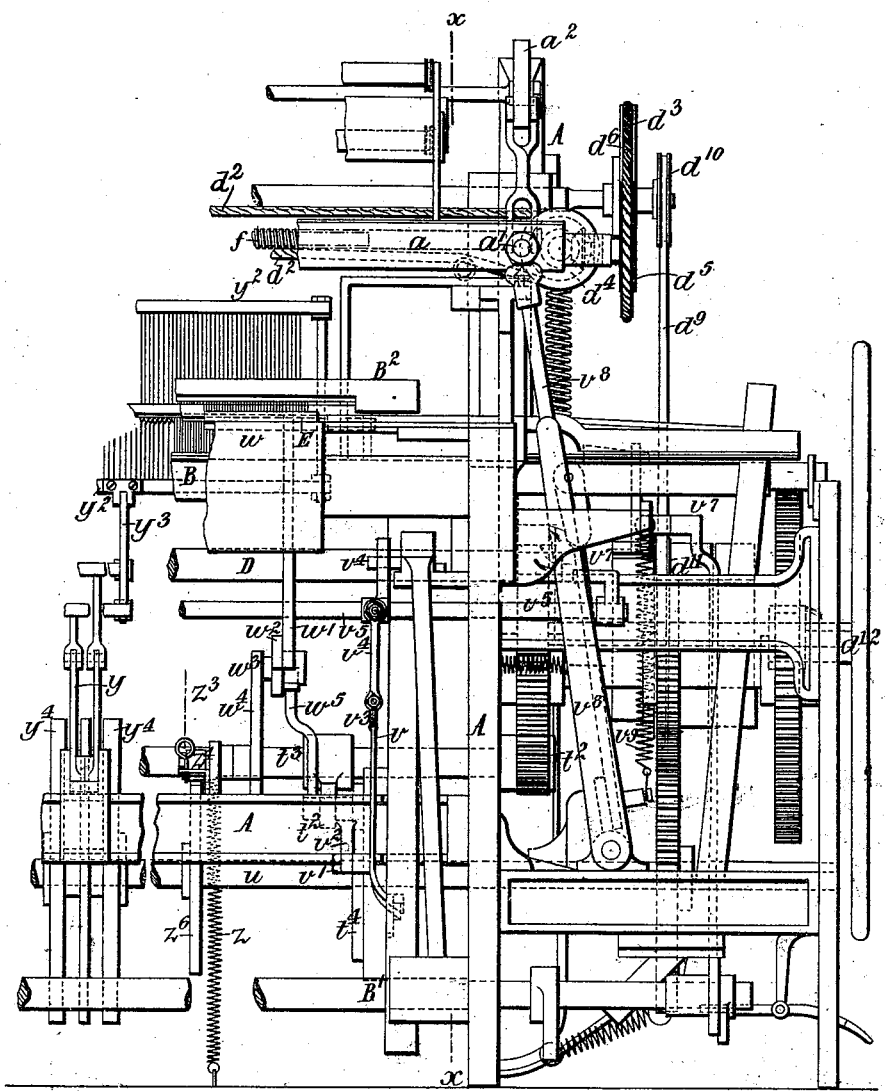
Figure 5:
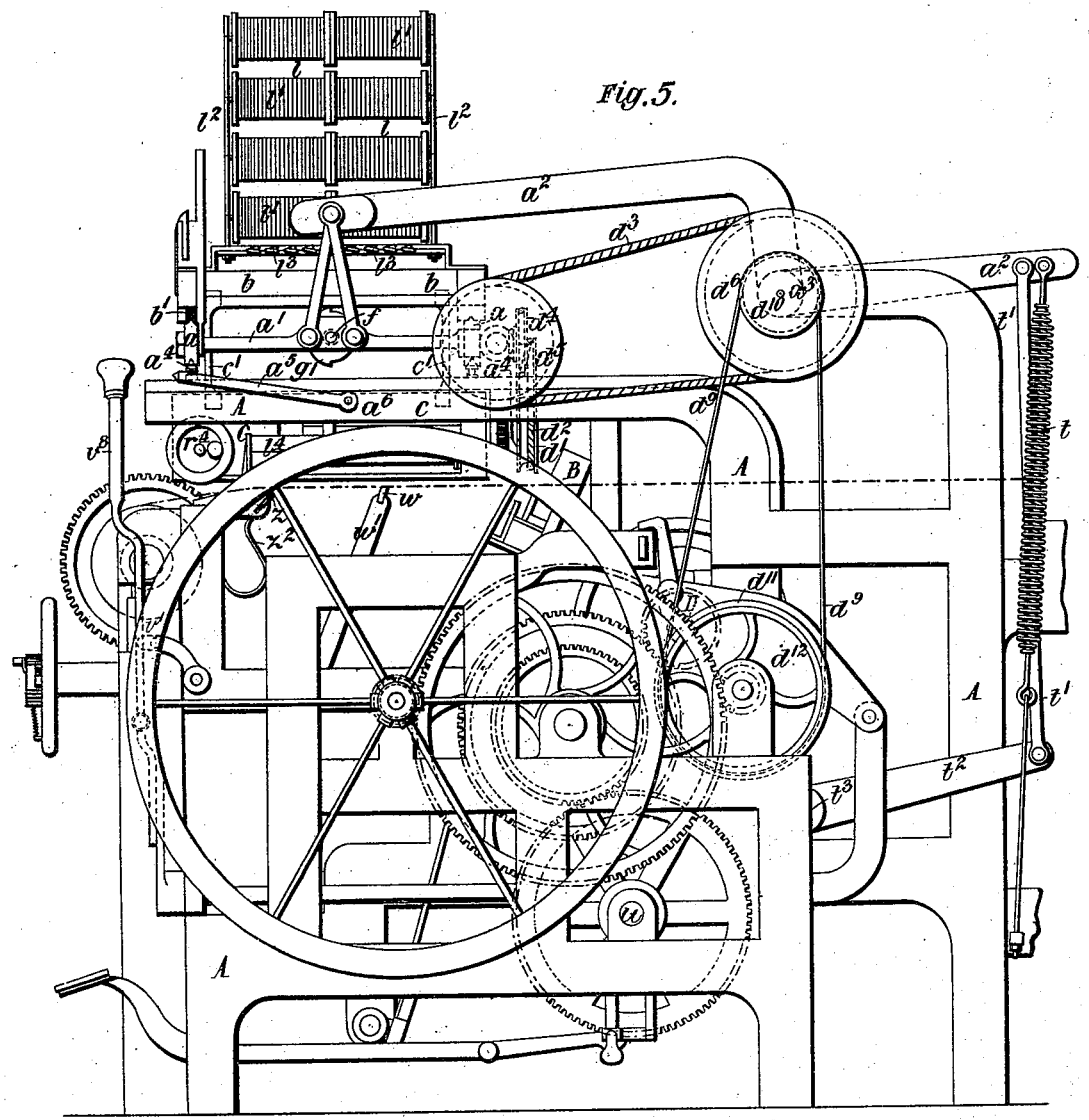
Figure 6:
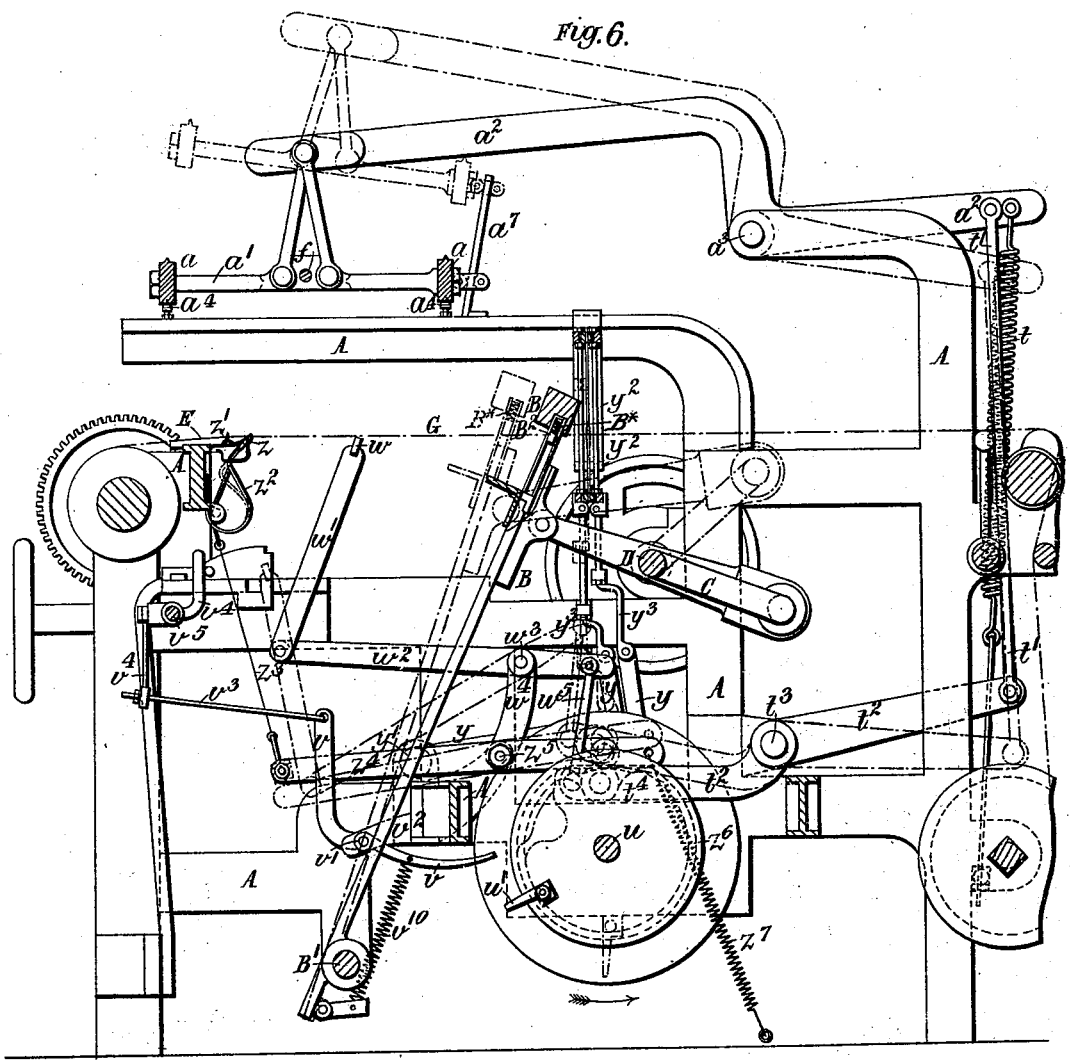
Figure 7:
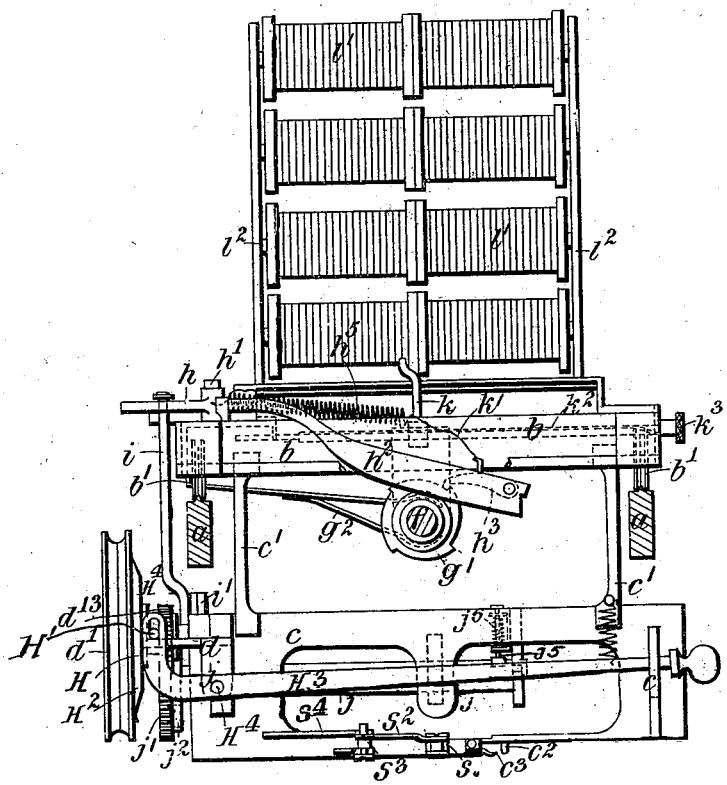
Figure 8:
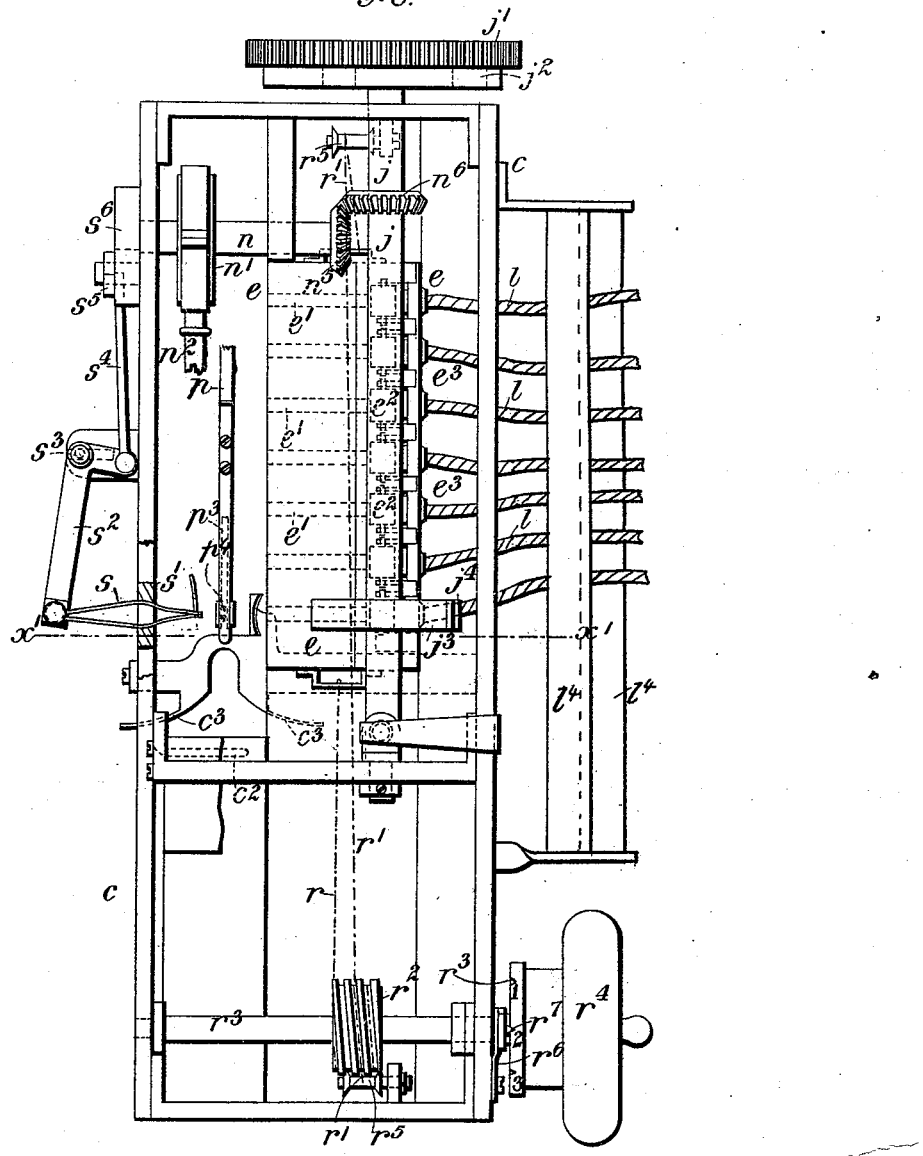
Figure 9:
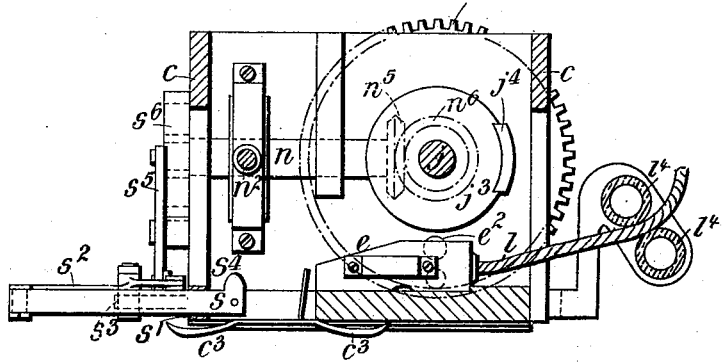
Figure 16:
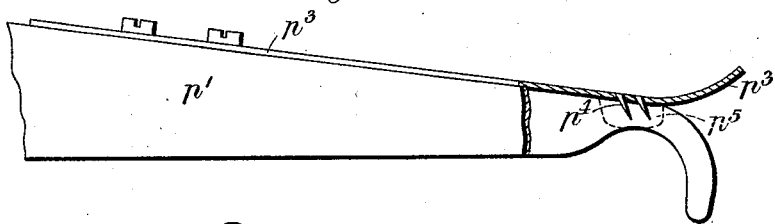
Figure 17:
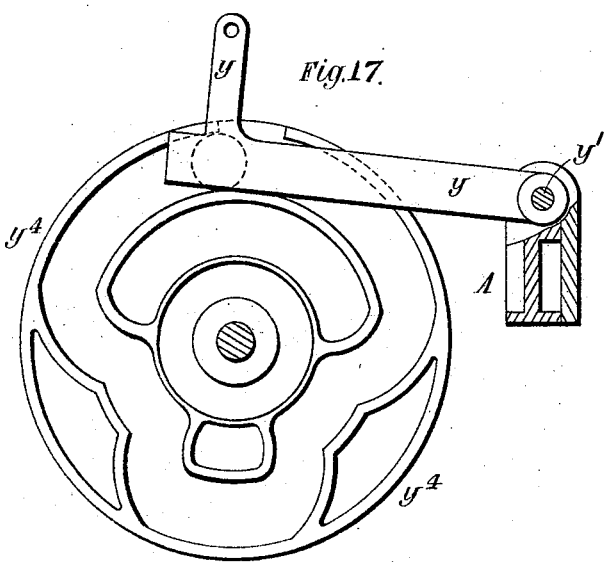
Figure 18:
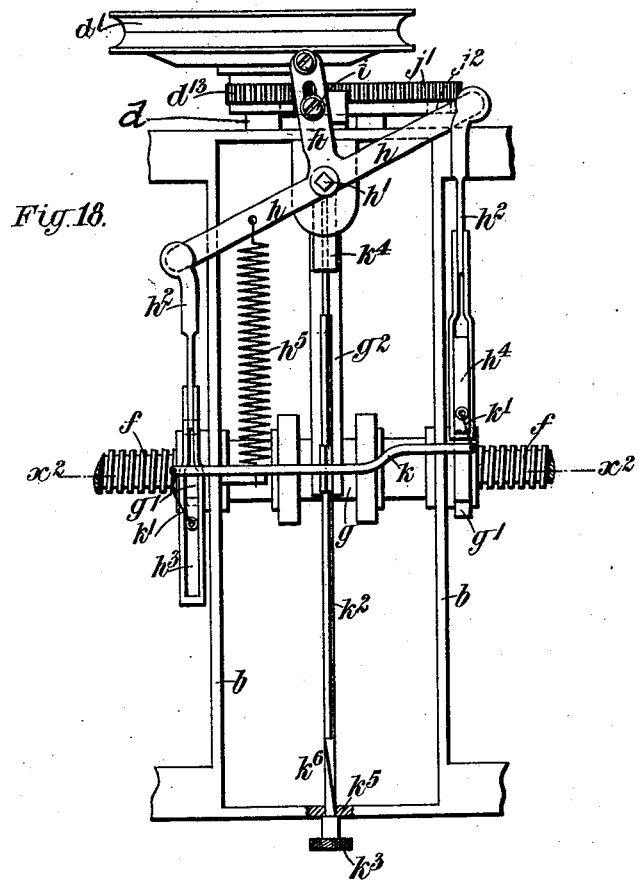
Figure 19:
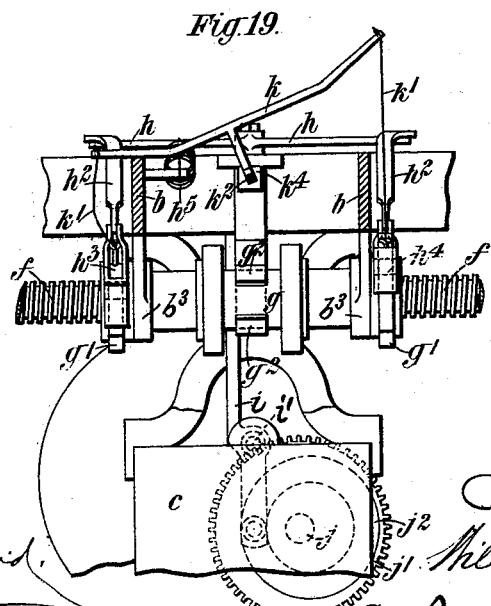
Figure 21:
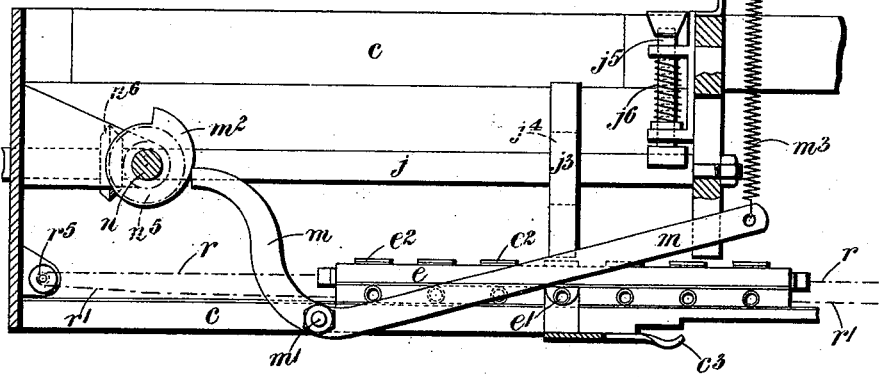
Figure 26:
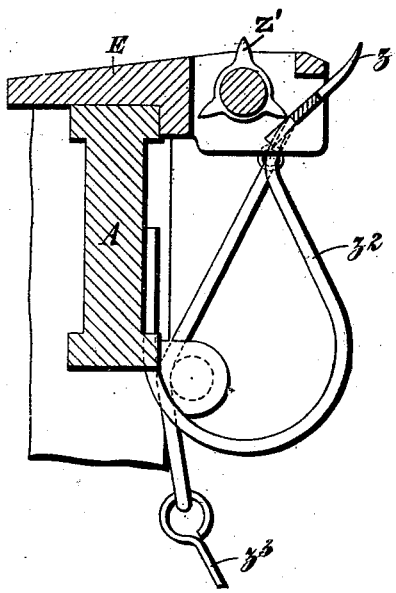
Figure 25:
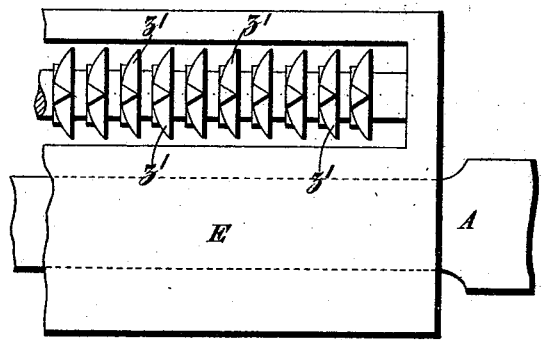
Figures 22, 23:
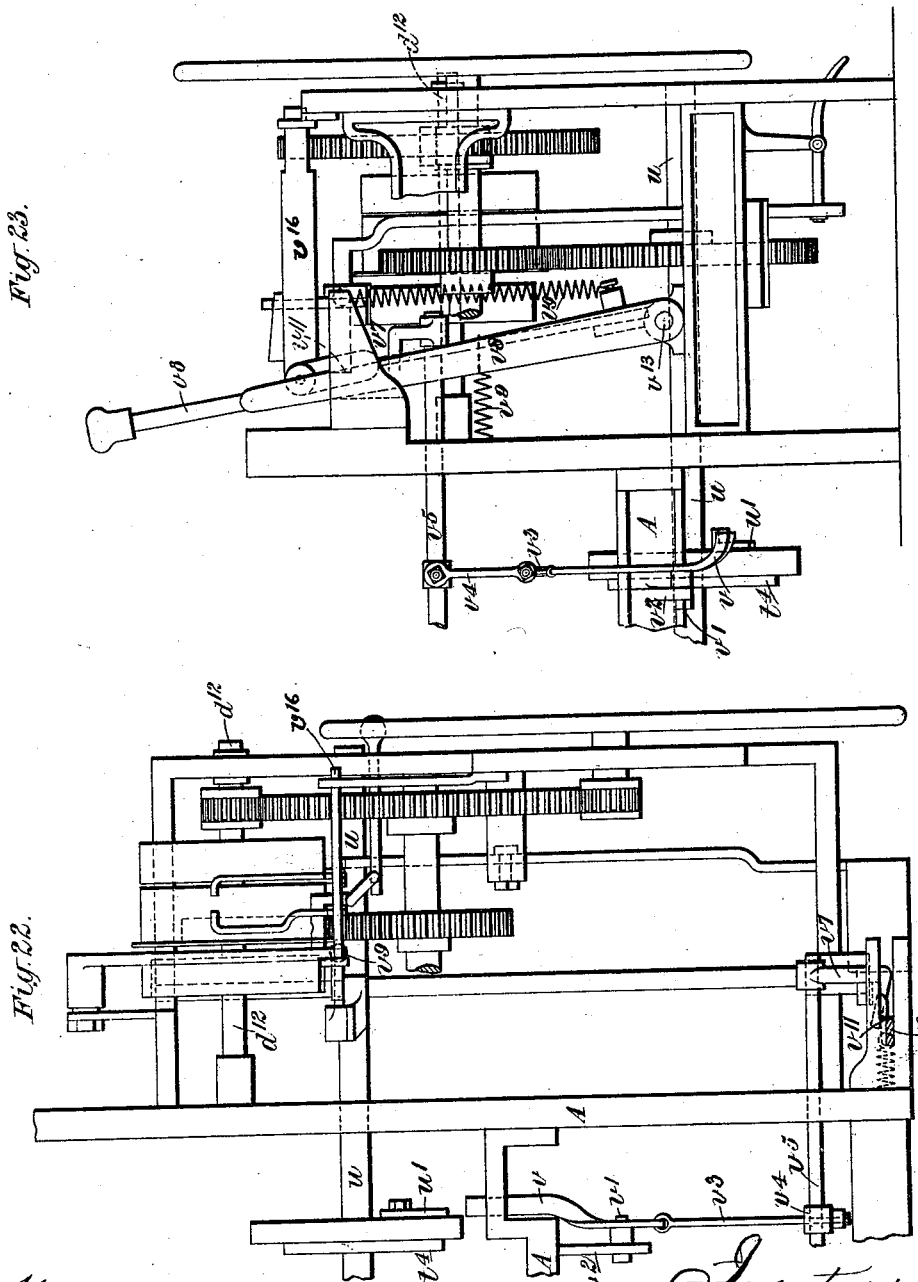
Figure 27:
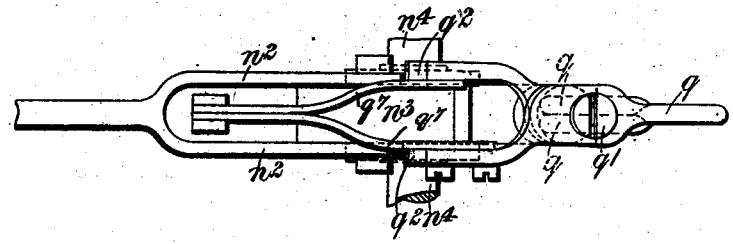
Figure 28:
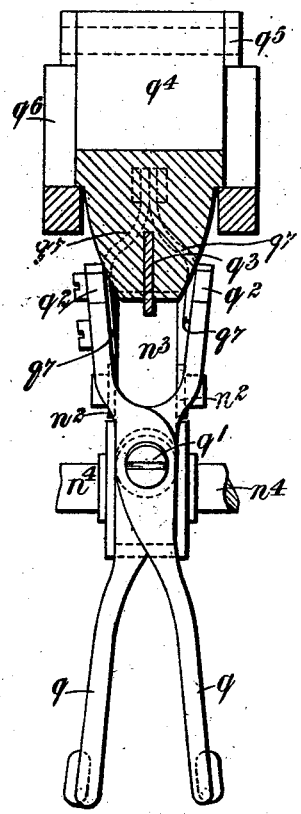

In the accompanying drawings, Figures 1 and 2 show a plan, Figs. 3 and 4 a front elevation and Fig. 5 a side elevation of one form of my improved machine. Fig. 6 is a section on the line $x$, $x$ Figs. 2 and 4, the box or frame and carriage being removed. Fig. 7 is a side elevation, partly in vertical section, from the left of Fig. 1, showing the carriage and the box or frame carrying the mechanism for feeding the worsted to and inserting it in the fabric. Fig. 8 is a plan, partly in horizontal section, drawn to an enlarged scale, showing the feed mechanism and the device for adjusting the feed slide. Fig. 9 is a vertical section on the line $x'$ $x'$ Fig. 8. Fig. 10 is a side elevation; Fig. 11 a plan, and Figs. 12 and 13 are side elevations, all drawn to an enlarged scale, showing the mechanism for inserting and knotting the pieces or tufts of worsted. Fig. 14 is a side elevation, and Fig. 15 an under side view drawn to a still further enlarged scale, showing a device for causing the knotting tweezers to tightly grip the pieces or tufts of worsted. Fig. 16 is a side elevation, partly in vertical section, showing a portion of the forked lever for inserting the pieces of worsted in the ground chain, and Fig. 17 is a sectional elevation showing a portion of the treadle motion hereinafter described. Fig. 18 shows a portion of Fig. 1 drawn to an enlarged scale, some of the parts being removed. Fig. 19 is a vertical section on the line $x^2$, $x^2$, Fig. 18. Fig. 20 is a transverse section of the feed-slide. Fig. 21 is a sectional side elevation showing the knife for cutting the yarn, and illustrating more clearly the operation of the shaft for actuating the feed-rolls. Fig. 22 is a plan, and Fig. 23 a front elevation illustrating more clearly the mechanism for stopping the loom. Fig. 24 is a side elevation showing the rails upheld as hereinafter described to permit the beating of the lathe. Fig. 25 is a plan, and Fig. 26 a vertical section, both drawn to an enlarged scale, showing the means for preventing contraction of the carpet while the comb is withdrawn. Fig. 27 is a plan, and Fig. 28 a front elevation, showing more clearly the nippers $q$ hereinafter described.

Like letters indicate corresponding parts throughout the drawings.

A is the frame of the machine.

B is the lathe which is pivoted at B' to the said frame, and is operated by cranks C, C formed or fixed upon the shaft D. This shaft is connected by gearing in a well known manner with the driving-shaft of the loom.

E is the breast plate of the loom.

$a$, $a$ are two rails which are connected at each end by cross-bars $a'$, whereby they are suspended from levers $a^2$ pivoted at $a^3$ to the frame A. These rails are adapted to rest at each end upon the said frame.

$b$ is the carriage which is provided with rollers or wheels $b'$ and is arranged to move to and fro upon the said rails.

$c$ is a box or frame suspended from this carriage by means of rods or connecting pieces $c'$.

A driving shaft $d$ is fitted to rotate in suitable bearings in the box or frame $c$ and has mounted upon it a pulley $d'$ to which motion is transmitted from the counter shaft of the loom through the medium of suitable gearing, comprising bands or ropes $d^2$, $d^3$, pulleys $d^4$ $d^5$, $d^6$; the said pulleys $d^4$ $d^5$ are connected by miter wheels $d^7$, $d^8$ and a belt $d^9$ connects a pulley $d^{10}$ fixed on the same shaft as the pulley $d^6$ with a pulley $d^{11}$ fixed to the loose pulley on the counter shaft $d^{12}$. The knotting mechanism which is actuated by the shaft $d$ is therefore only in motion when the shaft $d^{12}$ is stopped and the driving belt on the loose pulley, the lathe and the knotting mechanism not being required to work at the same time.

$e$ is the feed slide through which the different colored worsteds are passed, and which is arranged to be moved or adjusted as hereinafter described or in any other convenient manner, to bring the worsted of the desired color into position for insertion into the ground chain of the fabric.

For intermittently moving the carriage $b$ across the loom alternately in either direction, I employ the following mechanism that is to say: A screw threaded rod $f$ extends from one to the other end of the rails $a$ on which the carriage $b$ travels the said rod being firmly fixed at its ends in the cross bars $a'$ connecting the said rails. This screw threaded rod I will for convenience of description hereinafter term the traverse screw. I provide a suitable nut $g$ which works upon the said traverse screw, and bears against projections or lugs $b^3$ on the carriage $b$ for the purpose of moving the said carriage, and which has fixed on each end of it a ratchet wheel $g'$, Figs. 1, 3, 5, 7, 18 and 19 with four or any other suitable number of teeth. On the top of the carriage $b$ I provide a T-shaped or three armed lever $h$ Figs. 1, 3, 7, 18 and 19 which is pivoted upon a suitable pin or stud $h'$ fixed in the said carriage. Two pawl carriers $h^2$ are coupled to this lever one to each of two arms thereof; the pawls are placed in their carriers so that one of the said pawls $h^3$ points and gears in with its ratchet wheel in one direction and the other of the said pawls $h^4$ in the reverse direction. The third arm of the lever $h$ is suitably connected to a lever $i$ which is pivoted at $i'$ to the box or frame $c$, Fig. 19, and is operated by a stud on the said lever $i$ working in a cam groove $j^2$ in a toothed wheel $j'$ fixed upon the shaft $j$ for operating the feed-rolls hereinafter described; the said wheel $j'$ is geared with a pinion $d^{13}$ fixed on the driving-shaft $d$. In the rotation of the wheel $j'$ the lever $i$ will operate the lever $h$ in such a manner as to move the box or frame $c$ intermittently across the loom in one or the other direction according to which of the pawls $h^3$ $h^4$ is in gear with its ratchet wheel $g'$. A spring $h^5$ is connected with the said lever $h$ for the purpose of effecting its return movement; or a positive motion may be imparted to the said lever alternately in either direction by means of the cam-groove $j^2$ and lever $i$. A suitable spring brake $g^2$ Figs. 7, 18 and 19, is applied to the nut $g$ to prevent undue movement thereof upon the traverse screw, when partially rotated by one or other of the said pawls. This brake is attached to the carriage $b$, and is made with a pair of jaws which firmly grip the nut $g$ and thus produce sufficient friction to prevent movement thereof after the pawl has ceased to act upon the ratchet wheel. I provide suitable means whereby either of the said pawls may be held out of engagement with the corresponding ratchet-wheel, while the other pawl is permitted to engage with its ratchet wheel and whereby either of the said pawls may be put out of gear and the other pawl simultaneously put into gear with the corresponding ratchet wheels. I am thus enabled to reverse the movement of the carriage $b$ along the rails $a$ when a row of tufts has been inserted. To accomplish this result I find it advantageous to connect the said pawls with cords or chains $k'$ which are attached respectively to two arms of a lever $k$ fixed upon a shaft $k^2$. This shaft extends from the front to the rear of the carriage $b$ and is supported in suitable bearings $k^4$, $k^5$ Figs. 18 and 19 therein so that it can be moved longitudinally to and fro. One end of the said shaft $k^2$ extends through the front of the said carriage $b$ and is provided with a convenient knob or handle $k^3$ for operating it. A portion $k^6$ of the said sliding shaft is made square or of other suitable shape in transverse section and works in a correspondingly shaped hole in the front of the said carriage. This portion of the said shaft is slightly twisted, so that, when the shaft is moved longitudinally in one or the other direction, it will be caused to turn about its axis in the corresponding direction, and will, through the medium of the said lever $k$ and cords or chains $k'$ raise either the pawl $h^3$ or the pawl $h^4$ and simultaneously lower the other pawl, thus reversing the travel of the carriage $b$. The said lever $k$ can be conveniently operated by hand from the front of the loom through the medium of the said shaft $k^2$ and knob or handle $k^3$.

The feed-slide $e$ is divided into as many compartments as there are colors in the carpet to be made each compartment having an aperture or passage $e'$, Figs. 8, 20, and 21 through which the worsted is fed. A pair of feed rolls $e^2$ Figs. 8, 9 and 20, is arranged in conjunction with each of the said compartments. These feed rolls are situated one above the other and are held down by springs $e^3$ bearing upon the axle of the upper roll so that they will readily adjust themselves to any inequalities in the thickness of the worsted. The different colored worsteds $l$ are wound upon different bobbins $l'$ placed upon suitable rods supported in a frame $l^2$ secured upon the carriage $b$. Each worsted is conducted from the bobbin upon which it is wound, and is passed through a separate curved hook or guide $l^3$ provided at the lower end of the said frame $l^2$. Two guide rods $l^4$ are, moreover, provided between which the worsteds are passed before they enter the feed slide $e$.

It is obvious that I can, if desired, substitute for the bobbins $l'$ balls of worsted which are arranged in a well-known manner in boxes or cages carried by the frame $l^2$ so that the worsted may be drawn from the interior of the said balls.

Each worsted is passed between the corresponding feed rolls $e^2$ and is arranged to be fed thereby through the feeding slide $e$. The upper feed rolls are operated as required by means of a feed wheel or cam $j^3$ Figs. 8 and 9 which is fixed on the shaft $j$ and which is provided upon its periphery with a piece $j^4$ of india-rubber, leather or other suitable material, which, in each rotation of the said wheel, will engage with the fluted periphery of one or other of the upper feed rolls and will rotate the said roll and the corresponding lower feed roll. The length of this piece $j^4$ of rubber, leather or other material on the feed wheel $j^3$ will determine the length of the pieces of worsted fed through the slide $e$ and cut or severed in each operation of the feed and cutting mechanism.

To obviate liability to breakage of the parts of the feed mechanism by reason of hard substances contained in or attached to the worsted, or by reason of the worsted being of extra thickness in some parts, I provide for permitting the feed-shaft $j$ to move upward through a short distance when undue pressure is exerted thereon by the worsted. For this purpose I sometimes arrange the bearing for the front end of the said shaft $j$, so that the said shaft can move up and down at this end; and I provide a rod $j^5$ acted upon by a spring $j^6$ as shown in Figs. 7 and 21, or by a suitable weight for holding the said shaft down under normal conditions while permitting it to rise when necessary.

The feed mechanism is so arranged that it will feed the worsted into the proper position to be operated upon by the knotting mechanism hereinafter described; and a knife or cutter $m$ Figs. 10 and 21, is arranged in combination with the feed mechanism for cutting the worsted as soon as the feed movement ceases. The said knife or cutter $m$ is pivoted at $m'$ to the frame $c$ and is operated by means of a cam $m^2$ fixed upon a shaft $n$ of the knotting mechanism hereinafter described, and by a spring $m^3$ connected at one end to the said knife and at the other end to the frame $c$; or it may be operated in any other suitable manner. The cutting edge of the said knife is in contact with the adjacent surface of the slide $e$ so that it will sever a piece from the worsted projecting from the said slide.

The knotting mechanism is constructed as follows, viz:—An eccentric $n'$ is fixed upon the shaft $n$ and is coupled by means of a forked eccentric rod $n^2$ to an arm or segment $n^3$ fitted to turn upon a pin or stud $n^4$ fixed in the frame $c$. This arm or segment $n^3$ is, moreover, coupled by means of a connecting rod or link $p$ to the short arm of a lever $p'$, which is pivoted at $p^2$ to the frame $c$, and the long arm of which is forked to adapt it for pushing the ends of the pieces of worsted through the ground chain G so as to inclose two threads thereof. The shaft $n$ is geared by means of bevel-wheels $n^5$, $n^6$ with the shaft $j$ from which it receives its motion. $q, q$ Figs. 8, 9, 10, 11, 12, 27 and 28 are the nippers or tweezers for seizing the ends of the pieces of worsted, after they have been pushed through the chain by the lever $p'$, and for drawing them up through the said chain. The two parts of these nippers are pivoted at $q'$ to the said arm or segment $n^3$ so that they can be turned about the pivot to open and close them, and they are curved to form an arc of a circle. I prefer to so construct the said tweezers that the two parts or jaws thereof cross each other, and so that, when open, they will not spread the warp or chain threads when inserted therethrough as shown in Figs. 10, 11 and 12. I thus insure the more efficient working of the apparatus. The upper ends of the said jaws are provided with pins or studs $q^2$ which, in the movement of the said arm or segment $n^3$ in the direction indicated by the arrow in Fig. 12, will strike against a projection $q^3$ upon a lever or plate $q^4$ which is pivoted at $q^5$ to a bracket $q^6$ secured to the frame $c$ and the two jaws of the nippers will thus be moved apart or opened. The said nippers or tweezers may be provided with a spring or springs as shown at $q^7$ Figs. 27 and 28 whereby they are kept closed except when opened by the projection $q^3$. The said pivoted lever or plate $q^4$ is so arranged that, in the return movement of the said arm or segment $n^3$, it will be raised by the said pins or studs $q^2$ so that the latter can pass under it, and the nippers or tweezers $q$ will, under the action of said spring or springs, remain closed until the said segment is again moved in the direction indicated by the arrow in Fig. 14. To obviate any liability to slipping of the worsted out of the said tweezers, I prefer to provide fixed inclined pieces or cams $q^7$ Figs. 14 and 15, which, while the said tweezers are moving upward to tighten the knot, engage with the said tweezers and cause them to grip the worsted very tightly.

For moving or adjusting the feed-slide $e$ to bring one or other of the pairs of feed-rolls into position to be operated by the feed-wheel $j^3$ according to the color of the worsted which it is desired shall be inserted into the fabric, I provide the following mechanism, viz: I connect with the ends of the said slide $e$ suitable chains $r, r'$, Figs. 1 and 8, which are wound around and secured to a spirally grooved drum or worm $r^2$ fixed upon a shaft $r^3$ which is mounted in suitable bearings in the box or frame $c$ and which is provided with a handle or hand-wheel $r^4$ Fig. 8, for operating it. The chain $r$ is wound in one direction around the said drum or worm and secured at its extremity to the said drum or worm. The chain $r'$ is passed around guide-pulleys $r^5$ and is wound around the said drum or worm $r^2$ in the reverse direction, its extremity being secured to the said drum or worm. The hand-wheel $r^4$ (Fig. 8) is numbered or otherwise marked upon its hub or upon its periphery to indicate to the attendant the color of worsted being woven and thus facilitate the adjustment of the slide $e$ for the purpose of changing the colors. A spring $r^6$ is also provided having a suitable projection or tooth $r^7$ to engage in one or other of a series of notches $r^8$ in the hand-wheel $r^4$ for the purpose of retaining the said hand-wheel in any position to which it may be adjusted.

In place of the conveyer described in the said patent for laying the worsted, as it comes from the feed-slide $e$ upon the ground-chain G, I provide a pair of nippers or tweezers $s$ arranged to move in a guide-way $s'$ in the box or frame $c$. These nippers or tweezers are of the shape shown in Fig. 8 and are made of spring steel so as to always tend to open as wide as they can. When the nippers are pushed into the slot $s'$ as far as they can go, the jaws are open and ready to receive the worsted. As the worsted is fed out by the feed rolls, the nippers $s$ are withdrawn at the same rate through the slot $s'$ and by reason of their shape they begin to close until when the nippers are about half way out they grip the end of the worsted and guide it across the ground chain. From the peculiar form of the nippers, as shown in the drawings, it will be readily understood that the nippers remain closed and retain hold on the worsted until they are nearly withdrawn from the slot when the jaws open and release the worsted leaving the latter in proper position across the ground chain in the path of the forked lever $p'$. As the nippers are pushed into the slot $s'$ the jaws gradually close and open again so that when they are fully pushed in they are open as hereinbefore stated. The nippers or tweezers $s$ are coupled to a bent lever $s^2$ pivoted at $s^3$ to the frame $c$ and are operated, through the medium of the connecting rod or link $s^4$ and lever $s^5$ by a box cam $s^6$ fixed upon the shaft $n$. I find it advantageous to provide the said forked lever $p'$ with a spring $p^3$ having pins or points $p^4$ which project through the space in the forked end of the said lever, and which, when the piece or tuft of worsted is laid upon the ground-chain, will engage with the said tuft and retain the same in place until its ends are pushed down between the chain-threads and are seized by the nippers or tweezers $q$ for drawing them up again and thus forming the knot. I prefer to make the said spring $p^3$ with a clip $p^5$ to engage with the forked part of the said lever $p'$ as shown in Fig. 16, and thus prevent the spreading or opening of the same.

For connecting the shaft $d$ to the driving-pulley $d'$ and disconnecting it therefrom, a friction-clutch H is provided which is arranged to be moved into and out of gear with the driving-pulley $d'$ by means of a lever H' pivoted at $H^2$ to the frame $c$ and connected with another lever $H^3$ pivoted at $H^4$ to the said frame. The attendant can readily start and stop the mechanism for feeding, cutting and knotting the worsted, by simply raising and depressing the said lever $H^3$, and thus turning the lever H' about its pivot $H^2$ in one or the other direction and putting the clutch H into or out of gear. The lever $H^3$ is kept in one or other of two positions, that is to say, the clutch H is kept in or out of gear, by any suitable means such as for instance by a pin which may be inserted in different holes made in the said lever $H^3$, or the sides of the slot in which the said lever moves may be notched and the said lever made so as to spring in and out of the said notches in a manner well understood.

The operation of the apparatus above described is as follows, viz: Assuming that the parts are in the positions shown in Figs. 1 to 8, the attendant first adjusts the feed-slide $e$ according to the color of worsted to be fed into the fabric; he then puts the shaft $d$ in operative connection with the driving pulley $d'$ through the clutch H so that motion is transmitted by the gear-wheels $d^{13}$, $j'$, to the feed-shaft $j$, and through this shaft and the bevel-wheels $n^6$, $n^5$ to the shaft $n$. The parts are so constructed and arranged that the various operations are effected in the following order viz: The worsted is first fed through the slide $e$ and laid upon the ground-chain G. A piece of the required length is then cut or severed from the worsted, and this piece is inserted and knotted in the fabric, that is to say:—In the rotation of the feed-wheel $j^3$, the piece $j^4$ of india-rubber, leather or similar material operates the pair of feed-rolls beneath it, thus feeding from the slide $e$ a piece of worsted of the required length. The tweezers $s$ seize the said piece and lay it across the ground-chain, and the knife or cutter $m$ then descends and cuts or severs the said piece from the worsted. The forked lever $p'$ then descends and pushes the ends of the piece of worsted down between the chain-threads so that it incloses or embraces two of the said threads as indicated in Figs. 11 and 12, the said lever continuing its descent until it assumes the position shown in Fig. 12. In the rotation of the shaft $n$ and eccentric $n'$, the segment $n^3$ is partially rotated in the direction indicated by the arrow in Fig. 14, and the lower ends of the tweezers $q$ are thus caused to descend between the said two threads of the chain and are then opened by the projection $q^3$. As soon as the studs $q^2$ have passed the projection $q^3$, the tweezers are closed by their springs and thus caused to seize the ends of the piece of worsted beneath the ground-chain. The segment $n^3$ is then moved in the reverse direction to that indicated by the arrow in Fig. 14, and the tweezers $q$ are thus caused to draw the ends of the piece of worsted up through or between the ground-chain, as shown in Fig. 13, thereby forming the knot. In this movement of the tweezers $q$, their pins or studs $q^2$ come against the fixed inclined pieces or cams $q^7$ whereby the said tweezers are caused to firmly grip the ends of the piece of worsted while forming the knot.

Fig. 11 shows, in plan, the piece of worsted resting upon the ground-chain and the lever $p'$ about to push the ends of the said piece through the said chain. Fig. 12, shows in side elevation, the piece of worsted after its ends have been pushed through the chain by the said lever, and the tweezers $q$ about to seize the said ends. Fig. 13 shows, in side elevation, the piece of worsted after its ends have been seized by the tweezers $q$ and drawn up thereby through the ground-chain to form the knot. When the above mentioned operations are performed, the lever $i$ is actuated by the cam-groove $j^2$ and causes one or the other of the pawls $h^3$, $h^4$, to engage with the corresponding ratchet-wheel $g'$ and partially rotate the nut $g$, thereby moving the carriage $b$ and frame $c$ in the required direction through a distance sufficient to permit the insertion of another tuft of worsted, and the operations above mentioned are repeated. As soon as one row of tufts is inserted the attendant disengages the shaft $d$ from the driving-pulley $d'$, adjusts the pawls $h^3$, $h^4$ so as to reverse the movement of the carriage $b$ and frame $c$, and then puts the shaft $d$ again in gear with its driving-pulley $d'$. The rails $a$ on which the carriage $b$ travels are, as above mentioned, rigidly connected at each end by a cross-bar $a'$, and are attached to or suspended from the free end of levers $a^2$ pivoted at $a^3$ to the frame in the loom. These levers $a^2$ are connected with springs $t$, or are provided with suitable weights, which springs or weights should nearly counterbalance the weight of the said rails and the parts carried thereby. The said levers $a^2$ are connected by links $t'$ with levers $t^2$ the arms of which are fixed on a shaft $t^3$ supported in bearings in the frame A, and which are operated to raise the rails $a$ by suitable cams $t^4$ fixed on the shaft $u$. By these means, the said rails will be raised to permit the beating of the lathe after each row of tufts has been inserted, and will then be allowed to descend under the action of gravity until they rest upon the front portion of the frame A, the springs $t$ or the weights preventing the too rapid descent of the said rails. The rails $a$ are arranged to rest, when lowered, upon conical pins $a^4$, which are fixed in the frame A and which fit into corresponding holes or recesses in the said rails, thus insuring the lowering of the said rails always into the same position relatively to the fabric.

To permit the weaving of portions of fabric without the tufts of worsted (for instance, at the ends of rugs or pieces of carpet) I provide for supporting the rails $a$ in the position indicated by dotted lines in Fig. 6 and by full lines in Fig. 24 by means of rods or struts $a^5$ pivoted at $a^6$ to the frame A and formed with conical ends which fit into corresponding holes or recesses in the cross-bars $a'$, so that the lathe can be allowed to beat freely as often as may be required. The rails $a$ are moreover guided in their up and down movements by suitable guide-rods $a^7$.

The loom is provided with suitable means for automatically stopping it after the lathe has made the required number of beats. For this purpose I sometimes use a tappet $u'$ Figs. 6, 22 and 23 on the shaft $u$, which acts, at the proper time, upon a bent lever $v$ pivoted at $v'$ to a bracket $v^2$ attached to the frame A. This lever is connected by a rod $v^3$ with a bent lever $v^4$ fixed on a shaft $v^5$ supported in bearings in the said frame. The said lever $v^4$ operates through the medium of an arm $v^7$ also fixed on the said shaft $v^5$, to disengage the starting lever $v^8$ from a shoulder $v^{11}$, with which the said lever is caused to engage when the loom is started, and the said starting lever, when thus released, is moved by a spring $v^9$, or a suitable weight, so as to stop the loom. A spring $v^{10}$ is connected with the lever $v$ so that it will retain the parts in their proper position. The lever $v^8$ is fixed on a rock-shaft $v^{13}$, which is connected with any well-known form of clutch such as for instance a belt shipper for connecting the driving-shaft of the loom with or disconnecting it from the motor. To start the loom, the starting-lever $v^8$ is moved to the right until it engages with the shoulder $v^{11}$. The loom then operates until the lathe has made the predetermined number of beats, when the tappet $u'$ strikes the lever $v$, which through the medium of the lever $v^4$ shaft $v^5$ and arm $v^7$ disengages the starting-lever $v^8$ from the said shoulder and permits its return movement under the action of the spring $v^9$.

It is desirable that the ground-chain should be supported in the vicinity of the tuft-inserting mechanism during the operation of such mechanism. To provide for such support without interfering with the action of the lathe, I employ a supporting bar $w$ which is moved into and out of its operative position simultaneously with the lowering and raising of the rails $a$. The said bar $w$ is carried by arms $w'$ secured to the long arms of levers $w^2$ pivoted at $w^3$ to brackets $w^4$ attached to the frame A. The short arms of the levers $w^2$ are connected by links $w^5$ to the levers $t^2$.

I modify the construction of the harness-motion of the loom as follows, that is to say: Instead of arranging treadle-levers above and below the harness and employing operating cams outside of the main frame of the loom, I dispense with the treadle-levers above the harness, and provide for the operation of treadle-levers beneath the harness by means of suitable box-cams in such a manner that the said levers will impart both the upward and the downward motion to the heddles or healds. I prefer, moreover, to arrange the said treadles and box-cams inside of the main frame of the loom.

In the apparatus shown in the drawings, the treadle-levers $y$ are pivoted at $y'$ to the frame A and are coupled to the heddles or healds $y^2$ by links or rods $y^3$. Each of the levers $y$ is operated by means of a box-cam $y^4$ fixed on the shaft $u$ and so formed as to impart the required movements to the said levers. In wide looms I may, if desired, use two or more sets of treadle-levers and operating box-cams arranged as above described. The comb $z$ is fitted to slide in slots in the breast-plate E and is arranged to be operated by the following mechanism, which draws it downward to permit the beating of the lathe, and then releases it and effects its re-insertion into the fabric. This comb keeps the chain-threads at equal distances apart and thus facilitates the action of the forked lever $p'$ and nippers $q$. The said comb is, for this purpose, attached to springs $z^2$ which tend to retain it in the fabric, and is connected by cords or chains $z^3$ with levers $z^4$ pivoted at $z^5$ to the brackets $w^4$ and operated by cams $z^6$ which are fixed on the shaft $u$ and against which the said levers are held by means of springs $z^7$.

To prevent contraction of the carpet while the comb $z$ is withdrawn to permit the beating of the lathe B, I find it advantageous to arrange in the breast-plate E of the loom, near each edge of the carpet, wheels $z'$ provided with pins or pointed teeth which enter the carpet and keep the same stretched to its full width.

For holding down the chain-threads G behind the lathe and insuring the entrance of the teeth of the comb between the said threads, I so arrange a loose bar $B^2$ in slots in the back of the lathe B, that the said bar will rest upon the chain-threads and hold them down by its weight; or I make the bar $B^2$ of less weight and provide a spiral spring $B^*$ Fig. 4 at each end thereof, which spring bears upon its upper surface and holds it down upon the chain-threads.

I provide an inclined or curved foot $c^2$ on the under side of the box or frame $c$ in such a position that, during the insertion of the pieces of worsted and the tying of the knots, it will hold the chain-threads down so as to prevent their displacement from the comb. I also provide on the under side of the said box or frame c, inclined or curved pieces $c^3$ which, during the movement of the said box or frame along the rails a, will push the knotted tufts into their proper position in the fabric. One of these pieces will act during the movement of the box or frame in one direction and the other during the movement of the said box or frame in the reverse direction, the knotting mechanism being situated between them.

What I claim is—

1. In a loom for the manufacture of Turkey carpet, the combination of a traveling carriage which moves to and fro across the loom over the ground chain, worsted feeding and knotting mechanism supported by the said carriage, intermittently operating propelling mechanism, whereby the required movement is imparted to the said carriage, and reversing gear whereby the motion of the said propelling mechanism is reversed when the said carriage arrives at either end of its stroke or travel, substantially as, and for the purpose, above specified.

2. In a loom for the manufacture of Turkey carpet, the combination of an intermittently actuated traveling carriage which moves to and fro across the loom, feeding and knotting mechanism supported by the said carriage, a frame or holder mounted on the carriage for the bobbins or balls of worsted, and guides also on the carriage for the worsted, substantially as set forth.

3. In a loom the combination of an intermittently actuated traveling carriage which moves to and fro across the loom and feeding and knotting mechanism supported by the said carriage, said feeding and knotting mechanism having hinged or pivoted nippers or tweezers and fixed inclined pieces or cams whereby in the upward movement of the said nippers or tweezers they are caused to tightly grip the ends of the piece of worsted, substantially as described.

4. In a loom the combination of an intermittently actuated traveling carriage which moves to and fro across the loom, feeding and knotting mechanism supported by the said carriage, a feed slide also supported by the carriage, and adapted to be moved at right angles to the direction of motion of the carriage, chains or cords connected with the said feed slide, a drum or worm upon which the said chains or cords are wound in opposite directions, and an operating handle or handwheel fixed upon the shaft of the said drum or worm, substantially as, and for the purposes, set forth.

5. In a loom the combination of an intermittently actuated traveling carriage which moves to and fro across the loom, feeding and knotting mechanism supported by the said carriage, a feed slide also supported by the carriage and adapted to be moved at right angles to the direction of motion of the carriage, nippers, or tweezers, and actuating devices substantially such as above described whereby the said nippers or tweezers are caused to seize the worsted as it is fed from the said feed slide and lay the said worsted upon the ground chain, substantially as described.

6. The combination, with the forked lever for pushing the ends of the pieces of worsted down through the ground-chain, and means substantially such as above described for actuating the said forked lever, of a spring provided with pointed rods or pins to engage with and hold the pieces of worsted and formed with a clip to engage with the forked end of said lever, substantially as, and for the purposes, set forth.

7. In a loom the combination of an intermittently actuated traveling carriage, which moves to and fro across the loom, feeding and knotting mechanism supported by said carriage, rails arranged in front of the loom, on which the carriage is adapted to travel, and lifting mechanism for raising and lowering the said rails and carriage when required to permit the beating of the lathe and the operation of the feeding and knotting mechanism, substantially as described.

8. In a loom, the combination, with the rails arranged in front of the looms, of lifting mechanism for raising and lowering the said rails when required to permit the beating of the lathe and the operation of the feeding and knotting mechanism, and the rods pivoted to the frame of the loom, and adapted to be raised to engage the rails for supporting the said rails during the weaving of portions of the fabric without the tufts of worsted, substantially as set forth.

9. In a loom, the combination, with the rails arranged in front of the loom, the feeding and knotting mechanism traveling upon the said rails, and lifting mechanism for raising and lowering the said rails when required, of a supporting bar for the ground chain, lifting devices for raising and lowering the same, and connecting devices between the said lifting devices and the lifting mechanism for the rails, whereby, when the rails are lowered, the said bar will be raised, and when the rails are raised the said bar will be lowered, substantially as, and for the purposes above specified.

10. The combination, with the box or frame containing the feeding and knotting mechanism of inclined or curved pieces on the under side of the said box or frame, whereby the tufts when knotted are pushed into their proper position in the fabric, substantially as set forth.

In testimony whereof I have hereunto signed my name in the presence of two subscribing witnesses.

WILLIAM YOUNGJOHNS.

Witnesses:
JAMES MORTAN,
FRED GADSBY.